US008183337B1

(12) United States Patent
Pacetti

(10) Patent No.: US 8,183,337 B1
(45) Date of Patent: May 22, 2012

(54) METHOD OF PURIFYING ETHYLENE VINYL ALCOHOL COPOLYMERS FOR USE WITH IMPLANTABLE MEDICAL DEVICES

(75) Inventor: Stephen D. Pacetti, San Jose, CA (US)

(73) Assignee: Abbott Cardiovascular Systems Inc., Santa Clara, CA (US)

( * ) Notice: Subject to any disclaimer, the term of this patent is extended or adjusted under 35 U.S.C. 154(b) by 320 days.

(21) Appl. No.: 12/432,022

(22) Filed: Apr. 29, 2009

(51) Int. Cl.
*C08F 6/00* (2006.01)

(52) U.S. Cl. ........ 528/480; 528/491; 528/495; 528/499; 528/502 A; 528/502 D; 528/502 R; 528/503; 521/40; 521/40.5; 521/45; 521/49.5; 427/180; 427/181; 427/207.1; 428/43; 428/103; 428/357

(58) Field of Classification Search ................. 528/480, 528/481, 491, 493, 394, 495, 496, 497, 499, 528/502 R, 502 A, 502 C, 502 D, 502 E, 528/502 F, 503; 521/40, 40.5, 41, 44, 45, 521/45.5, 46, 46.5, 47, 48, 48.5, 49, 49.5, 521/49.8; 428/43, 103, 357; 427/180, 181, 427/207.1

See application file for complete search history.

(56) References Cited

U.S. PATENT DOCUMENTS

| | | | |
|---|---|---|---|
| 6,503,556 B2 | 1/2003 | Harish |
| 6,503,954 B1 | 1/2003 | Bhat |
| 6,540,776 B2 | 4/2003 | Millare |
| 6,555,157 B1 | 4/2003 | Hossainy |
| 6,656,506 B1 | 12/2003 | Wu et al. |
| 6,663,662 B2 | 12/2003 | Pacetti et al. |
| 6,713,119 B2 | 3/2004 | Hossainy et al. |
| 6,743,462 B1 | 6/2004 | Pacetti |
| 6,749,626 B1 | 6/2004 | Bhat et al. |
| 6,753,071 B1 | 6/2004 | Pacetti |
| 6,759,054 B2 | 7/2004 | Chen et al. |
| 6,780,424 B2 | 8/2004 | Claude |
| 6,790,228 B2 | 9/2004 | Hossainy et al. |
| 6,908,624 B2 | 6/2005 | Hossainy et al. |
| 6,926,919 B1 | 8/2005 | Hossainy et al. |
| 6,994,867 B1 | 2/2006 | Hossainy et al. |
| 7,011,842 B1 | 3/2006 | Simhambhatla et al. |
| 7,022,372 B1 | 4/2006 | Chen |
| 7,070,798 B1 | 7/2006 | Michal et al. |
| 7,087,263 B2 | 8/2006 | Hossainy et al. |
| 7,094,256 B1 | 8/2006 | Shah et al. |
| 7,105,018 B1 | 9/2006 | Yip et al. |
| 7,144,422 B1 | 12/2006 | Rao |
| 7,175,873 B1 | 2/2007 | Roorda et al. |
| 7,175,874 B1 | 2/2007 | Pacetti |
| 7,201,935 B1 | 4/2007 | Claude |
| 7,232,573 B1 | 6/2007 | Ding |
| 7,247,313 B2 | 7/2007 | Roorda et al. |
| 7,279,174 B2 | 10/2007 | Pacetti et al. |
| 7,285,304 B1 | 10/2007 | Hossainy et al. |
| 7,294,329 B1 | 11/2007 | Ding |
| 7,318,932 B2 | 1/2008 | Pacetti |
| 7,329,366 B1 | 2/2008 | Gale et al. |
| 7,329,413 B1 | 2/2008 | Pacetti et al. |
| 7,363,074 B1 | 4/2008 | Kwok et al. |
| 7,364,748 B2 | 4/2008 | Claude |
| 7,390,497 B2 | 6/2008 | DesNoyer |
| 7,390,523 B2 | 6/2008 | Pacetti et al. |
| 7,396,539 B1 | 7/2008 | Hossainy et al. |
| 7,413,574 B2 | 8/2008 | Yip et al. |
| 7,413,746 B2 | 8/2008 | Ding |
| 7,416,558 B2 | 8/2008 | Yip et al. |
| 7,431,959 B1 | 10/2008 | Dehnad |
| 7,445,792 B2 | 11/2008 | Toner et al. |
| 7,481,835 B1 | 1/2009 | Pacetti et al. |
| 7,491,233 B1 | 2/2009 | Ding |
| 7,536,221 B2 | 5/2009 | Kwok |
| 7,563,454 B1 | 7/2009 | Pacetti |
| 7,645,474 B1 | 1/2010 | Pathak |
| 2002/0188277 A1 | 12/2002 | Roorda |
| 2003/0097088 A1 | 5/2003 | Pacetti |
| 2004/0052858 A1 | 3/2004 | Wu |
| 2004/0052859 A1 | 3/2004 | Wu |
| 2004/0142015 A1 | 7/2004 | Hossainy |
| 2004/0220665 A1 | 11/2004 | Hossainy |
| 2005/0112172 A1 | 5/2005 | Pacetti |
| 2005/0119720 A1 | 6/2005 | Gale |
| 2005/0187376 A1 | 8/2005 | Pacetti |
| 2005/0208093 A1 | 9/2005 | Glauser |
| 2005/0238686 A1 | 10/2005 | Hossainy |
| 2005/0244363 A1 | 11/2005 | Hossainy |
| 2005/0245637 A1 | 11/2005 | Hossainy |
| 2005/0266038 A1 | 12/2005 | Glauser |
| 2005/0271700 A1 | 12/2005 | DesNoyer |
| 2006/0002974 A1 | 1/2006 | Pacetti |
| 2006/0062821 A1 | 3/2006 | Simhambhatla |
| 2006/0078588 A1 | 4/2006 | Hossainy |

(Continued)

FOREIGN PATENT DOCUMENTS

JP    2003205582 A  *  7/2003

(Continued)

OTHER PUBLICATIONS

Machine translation of JP 2003-205582.* Office translation of JP 2003-205582, Hashimoto et al.*
U.S. Appl. No. 11/418,697, filed May 4, 2006, Tang.
U.S. Appl. No. 10/317,435, filed Dec. 11, 2002, Hossainy et al.
U.S. Appl. No. 10/606,711, filed Jun. 26, 2003, Pacetti.
U.S. Appl. No. 10/631,228, filed Jul. 31, 2003, Pathak et al.
U.S. Appl. No. 10/807,546, filed Mar. 22, 2004, Hossainy et al.
U.S. Appl. No. 10/853,924, filed May 25, 2004, Pathak.
U.S. Appl. No. 10/883,247, filed Jun. 30, 2004, Andreacchi.
U.S. Appl. No. 12/475,296, filed May 29, 2009, Pacetti et al.
EVAL Ethylene Vinyl Alcohol Copolymer Resins, EVAL Company of America, 6034/891, 6 pgs. (1997).
EVAL Resins, EVAL Company of America, Technical Bulletin No. 100, 6 pgs. date not available.
EVAL Resins, EVAL Company of America, Technical Bulletin No. 110, 14 pg. (1996).
EVAL Resins, EVAL Company of America, Technical Bulletin No. 120, 13 pgs. (1996).
EVAL Resins, EVAL Company of America, Technical Bulletin No. 130, 6 pgs. (1994).
EVAL Resins, EVAL Company of America, Technical Bulletin No. 140, 1 pg. date not available.

(Continued)

*Primary Examiner* — James J Seidleck
*Assistant Examiner* — Frances Tischler
(74) *Attorney, Agent, or Firm* — Squire Sanders (US) LLP

(57) ABSTRACT

Methods for the purification of ethylene vinyl alcohol copolymers are provided.

24 Claims, No Drawings

U.S. PATENT DOCUMENTS

| | | |
|---|---|---|
| 2006/0115449 A1 | 6/2006 | Pacetti |
| 2006/0287709 A1 | 12/2006 | Rao |
| 2007/0016284 A1 | 1/2007 | Pacetti |
| 2007/0032853 A1 | 2/2007 | Hossainy |
| 2007/0032858 A1 | 2/2007 | Santos |
| 2007/0110787 A1 | 5/2007 | Hossainy |
| 2007/0116857 A1 | 5/2007 | Pacetti |
| 2007/0202323 A1 | 8/2007 | Kleiner |
| 2007/0269584 A1 | 11/2007 | Pacetti |
| 2007/0280988 A1 | 12/2007 | Ludwig |
| 2008/0004695 A1 | 1/2008 | Stewart |
| 2008/0021008 A1 | 1/2008 | Pacetti |
| 2008/0044675 A1 | 2/2008 | Ding |
| 2008/0071027 A1 | 3/2008 | Pacetti |
| 2008/0075833 A1 | 3/2008 | Pacetti |
| 2008/0099442 A1 | 5/2008 | Gale |
| 2008/0113207 A1 | 5/2008 | Pacetti |
| 2008/0138497 A1 | 6/2008 | Pacetti |
| 2008/0154231 A1 | 6/2008 | Kwok |
| 2008/0154232 A1 | 6/2008 | Kwok |
| 2008/0167711 A1 | 7/2008 | Roorda |
| 2008/0167712 A1 | 7/2008 | DesNoyer |
| 2009/0005861 A1 | 1/2009 | Hossainy |
| 2009/0104247 A1 | 4/2009 | Pacetti |

FOREIGN PATENT DOCUMENTS

| | | |
|---|---|---|
| WO | WO 02/26271 | 4/2002 |
| WO | WO 02/26281 | 4/2002 |

OTHER PUBLICATIONS

EVAL Resins, EVAL Company of America, Technical Bulletin No. 150, 8 pgs. date not available.

EVAL Resins, EVAL Company of America, Technical Bulletin No. 160, 8 pgs. (1994).

EVAL Resins, EVAL Company of America, Technical Bulletin No. 170, 9 pgs. (1987).

EVAL Resins, EVAL Company of America, Technical Bulletin No. 180, 12 pgs. date not available.

EVAL Resins, EVAL Company of America, Technical Bulletin No. 190, 7 pgs. (1994).

EVAL Resins, EVAL Company of America, Technical Bulletin No. 200, 8 pgs. (1994).

Aucejo et al., "Effect of Water Presence on the Sorption of Organic Compounds in Ethylene-Vinyl Alcohol Copolymers", J. of Appl. Polymer Science, vol. 70, pp. 711-716 (1998).

Okaya et al. "Ethylene-Vinyl Alcohol Copolymers", Edited by C.A. Finch, pp. 196-267 (1992).

Thai-Horng Young, "Phase Behavior of EVAL Polymers in Water-2-Propanol Cosolvent", Macromolecules 31, pp. 1229-1235 (1998).

* cited by examiner

METHOD OF PURIFYING ETHYLENE VINYL ALCOHOL COPOLYMERS FOR USE WITH IMPLANTABLE MEDICAL DEVICES

FIELD

This invention is directed to methods for purifying ethylene vinyl alcohol copolymers for use in the manufacture of implantable medical devices and as coatings on implantable medical devices.

BACKGROUND

The biocompatibility requirements for implantable medical devices are quite high. The materials of which they are made or impurities in those materials should not cause or contribute to inflammatory responses, immunological responses or any other undesirable side effects. Regulatory requirements further stipulate that permanently implanted materials be of high purity.

Implantable medical devices, particularly stents, have been developed for use in the local administration of therapeutic substances to a diseased site. These devices may be fabricated from a biocompatible polymer and a therapeutic substance can be incorporated in the body of the device or they may be coated with a biocompatible polymer containing the therapeutic substance. If a coating is used, it too, must have the biocompatibility characteristics mentioned above.

Commercially available polymers that might be useful in the production of implantable medical devices or for coatings on such devices can contain impurities that can trigger adverse biological responses in a patient. For example, the polymers may contain impurities such as catalysts, initiators, processing aids, suspension aids, unreacted monomers, metal salts, low molecular weight oligomers and the like. To ameliorate this situation, commercial polymers are often purified by the implantable medical device manufacturer prior to use. Many of the processes employed to purify polymers, however, are time consuming, costly and inefficient. The present invention provides a cost effective, efficient method for the purification of one such family of polymers, poly(ethylene-co-vinyl alcohol) copolymers.

SUMMARY

The present invention is directed to methods of purifying poly(ethylene-co-vinyl alcohol) copolymers.

Thus, an aspect of the invention is a method comprising: providing a quantity of poly(ethylene-co-vinyl alcohol); dissolving the polymer in a sufficient quantity of an alcohol or an alcohol/water mixture at an elevated temperature so as to achieve substantially complete dissolution; cooling the dissolved polymer solution until a gel forms; combining the gel with a fluid while agitating the admixture until polymer particles form, wherein the fluid is the same as or different than the alcohol or alcohol/water used initially to dissolve the polymer and is at about the same temperature as the cooled dissolved polymer solution; isolating the polymer particles; and drying the isolated particles. The method is optionally repeated one or more additional times. For each repetition, the quantity of polyethylene-co-vinyl alcohol) provided is the polymer particles, as isolated or dried in the preceding application of the method. For each repetition, the alcohol or alcohol/water mixture is the same or a different alcohol or alcohol/water mixture than used in the preceding application of the method. Similarly, the fluid is the same or a different fluid than the preceding application of the method.

In an aspect of the invention, dissolving the polymer in a sufficient quantity of the alcohol or alcohol/water mixture occurs over about 0.5 to about 5.0 hours.

In an aspect of the invention, the dissolved polymer solution is not agitated during cooling.

In an aspect of the invention, the dissolved polymer solution is agitated during cooling.

In an aspect of the invention, the alcohol is selected from the group consisting of methanol, ethanol, n-propanol, isopropanol or a combination thereof.

In an aspect of the invention, the alcohol/water mixtures comprises 35% water by weight or less.

In an aspect of the invention, the alcohol is methanol and the elevated temperature is about 90° C.; or the alcohol is 95% ethanol and the elevated temperature is about 100° C.; or the alcohol/water mixture is selected from the group consisting of ethanol/water or isopropanol/water at about 2:1 to about 4:1 (w/w) and the elevated temperature is about 70° C.

In an aspect of the invention, the alcohol/water mixture is 90% methanol by weight, or 80% by weight of 95% ethanol.

In an aspect of the invention, cooling the dissolved polymer solution comprises exposing the solution to ambient conditions and allowing it to cool naturally to ambient temperature.

In an aspect of the invention, cooling the dissolved polymer solution comprises using a cooling jacket, cooling coils, or a combination thereof.

In an aspect of the invention, the fluid comprises an alcohol that may be the same as or different from the alcohol used to initially dissolve the polymer.

In an aspect of the invention, the fluid comprises an alcohol/water mixture that may be the same as or different than the alcohol or the alcohol/water mixture used to initially dissolve the polymer and may be at the same or different alcohol to water ratio.

In an aspect of the invention, the fluid comprises water.

In an aspect of the invention, the fluid comprises acetone, 2-butanone, ethyl acetate, methyl acetate, tetrahydrofuran, ether, or a class III ICH solvent.

In an aspect of the invention, the fluid comprises a non-polar solvent.

In an aspect of the invention, the non-polar solvent comprises hexane, cyclohexane, pentane, heptane, a $C_5$-$C_{12}$ branched, linear, cyclic, aliphatic, aromatic, or unsaturated hydrocarbon, or a combination thereof.

In an aspect of the invention, combining the fluid and the gel comprises adding the fluid to the gel or adding the gel to the fluid.

In an aspect of the invention, combining the fluid and the gel occurs over about 30 seconds to about 30 minutes.

In an aspect of the invention, isolating the polymer particles comprises filtration, centrifugation, or gravity sedimentation.

In an aspect of the invention, drying the polymer particles comprises exposing the particles to a temperature of from about 25° C. to about 120° C.

In an aspect of the invention, exposing the particles to the temperature comprises using a vacuum oven, a forced convection oven, a tumble drier or a fluidized bed drier.

In an aspect of the invention, the ethylene content of the poly(ethylene-co-vinyl alcohol) is about 20 mol % to about 50 mol %.

An aspect of the invention is a method of manufacturing an implantable medical device, comprising: providing a quantity of poly(ethylene-co-vinyl alcohol); purifying the quantity of poly(ethylene-co-vinyl alcohol) by the above method; and fabricating the implantable medical device, wherein the fabrication comprises at least one operation using a material comprising the purified poly(ethylene-co-vinyl alcohol).

In an aspect of the invention, fabricating the implantable medical device comprises providing an implantable medical device, and disposing a coating comprising the purified poly(ethylene-co-vinyl alcohol) over an outer surface of the implantable medical device.

An aspect of the invention is an implantable medical device comprising poly(ethylene-co-vinyl alcohol) purified by the above method.

DETAILED DESCRIPTION

As used herein, unless specified otherwise, any words of approximation such as, without limitation, "about," "essentially," "substantially" and the like mean that the element so modified need not be exactly what is described, but can vary from the description by as much as ±15% without exceeding the scope of this invention.

As used herein, any ranges presented are inclusive of the end-points. For example, "a temperature between 10° C. and 30° C." or "a temperature from 10° C. to 30° C." includes 10° C. and 30° C., as well as any temperature in between.

As used herein, the use of "preferred," "preferably," "more preferred," and the like to modify an aspect of the invention refers to preferences as they existed at the time of filing of the patent application.

As used herein, an "implantable medical device" refers to any type of device that is totally or partly introduced, surgically or medically, into a patient's body or by medical intervention into a natural orifice, and which is intended to remain there after the procedure. The duration of implantation may be essentially permanent, i.e., intended to remain in place for the remaining lifespan of the patient; until the device biodegrades; or until it is physically removed. The duration of implantation may be for several months or weeks. Examples of implantable medical devices include, without limitation, implantable cardiac pacemakers and defibrillators; leads and electrodes for the preceding; implantable organ stimulators such as nerve, bladder, sphincter and diaphragm stimulators, cochlear implants; prostheses, vascular grafts, self-expandable stents, balloon-expandable stents, stent-grafts, grafts, artificial heart valves, closure devices for patent foramen ovale, vascular closure devices, cerebrospinal fluid shunts, and intrauterine devices. An implantable medical device specifically designed and intended solely for the localized delivery of a drug is within the scope of this invention.

As used herein, an implantable medical device "device body" refers to the device in a fully formed utilitarian state with an outer surface to which no coating or layer of material different from that of which the device itself is manufactured has been applied. By "outer surface" is meant any surface however spatially oriented that is in contact with bodily tissue or fluids. A common example of a "device body" is a bare metal stent (BMS), which, as the name implies, is a fully-formed usable stent that has not been coated with a layer of any material different from the metal of which it is made. Of course, device body refers not only to BMSs but to any uncoated device regardless of that which it is made.

One form of implantable medical device is a "stent." A stent refers generally to any device used to hold tissue in place in a patient's body. Particularly useful stents, however, are those used for the maintenance of the patency of a vessel in a patient's body when the vessel is narrowed or closed due to diseases or disorders including, without limitation, tumors (in, for example, bile ducts, the esophagus, the trachea/bronchi, etc.), benign pancreatic disease, coronary artery disease such as atherosclerosis, carotid artery disease, peripheral arterial disease (PAD), restenosis and vulnerable plaque.

The terms "monomer," "oligomer," "polymer" and the like are meant to convey the general meaning of each term as understood by those of average skill in the art unless otherwise expressly set forth herein.

As used herein, "Cm to Cn," wherein m and n are integers refers to the number of possible carbon atoms in the indicated group. That is, the group can contain from "m" to "n", inclusive, carbon atoms.

As used herein, an "ICH class III solvent" is a solvent that the International Council on Harmonization has classified as less toxic than class I or II solvents and is recommended for use in production of drugs, excipients, and medicinal products instead of Class I and Class II solvents. Class I solvents have unacceptable toxicities and Class II solvents, although less toxic than Class I, may be limited to reduce the potential of adverse events in patients.

As used herein, a "particle" simply refers to a macroscopic fragment of material of no particular shape composed of an agglomeration of individual molecules of a compound, which may be a polymer.

As used herein, a material that is described as a layer or a film "disposed over" an indicated substrate refers to, e.g., a coating of the material deposited directly or indirectly over at least a portion of the surface of the substrate. "Directly deposited" means that the coating is applied onto the actual surface of the substrate. "Indirectly deposited" means that the coating is applied to an intervening layer that itself has been deposited directly or indirectly over the substrate. Unless the context clearly indicates otherwise, a reference to a layer, a coating layer, or a coating refers to a layer of material that covers all, or substantially all, of the outer surface of a device body, whether deposited directly or indirectly.

As used herein, "ambient temperature," refers to a typical room temperature that is about 20° C. to about 25° C.

As used herein, an "admixture" is the result of addition of one or more materials, solutions, or dispersions, to another material, solution, or dispersion.

Various embodiments of the present invention are directed to methods of purifying polyethylene-co-vinyl alcohol)s, to methods of manufacturing implantable medical devices from the purified copolymers and to methods of coating implantable medical devices with the copolymer.

Ethylene vinyl alcohol copolymer, commonly known as EVOH or by the trade name EVAL™, refers to a copolymer comprised of ethylene and vinyl alcohol monomers. Ethylene vinyl alcohol copolymers are typically produced by polymerizing ethylene with vinyl acetate, and then hydrolyzing the acetate groups to a hydroxyl functionality. The copolymer may also contain small amounts of additional monomers, for example less than about 5 mole percent of vinyl acetate, styrenes, propylene, and/or other monomers. Common examples of ethylene vinyl alcohol copolymers contain from about 27 to about 48 mol % ethylene and the methods herein are directed primarily to such copolymers although they may be extended to other monomer ratios without undue experimentation by those of ordinary skill in the art based on the disclosures herein; all such extensions of the methods herein are, therefore, within the scope of this invention. EVOH is available from a number of sources such as, without limitation, Aldrich Chemical Company, Milwaukee, Wis., or EVAL Company of America, Lisle, Ill., or they can be prepared by conventional polymerization procedures that are well known to those of ordinary skill in the art.

A currently employed process for the purification of EVOH is extraction of EVOH pellets or powder in a solvent followed by removal of the solvent. The process is time-consuming, taking about six to seven days. The polymer pellets do not completely dissolve in the solvent, so some impurities typically remain entrapped in the undissolved pellets or portions thereof. Although the EVOH polymer pellets may swell in certain solvents, efficient extraction of impurities is dependent on the dimension of the pellet as well as the diffusivity of impurities out of the center of the pellet. Consequently, extraction of solid EVOH pellets or powder may lead to incomplete purification. The present invention provides methods that are less time consuming and more thorough than simple solvent extraction.

The method herein for purification of EVOH includes, but is not necessarily limited to, the following general operations:

(1) Dissolving the EVOH in an alcohol or an alcohol/water mixture at an elevated temperature;

(2) Cooling the solution until the EVOH forms a gel;

(3) Combining a fluid with the gel such that polymer particles are formed;

(4) Isolating the polymer particles;

(5) Optionally repeating operations (1)-(4) one or more additional times; and (6) Removing the solvent from the polymer particles.

As noted above, commercial EVOH is usually provided as pellets. The first operation of the current method, then, is dissolving the pellets in an alcohol or an alcohol/water mixture at an elevated temperature. Alcohols that may be used include, without limitation, methanol, ethanol, n-propanol, and iso-propanol. Sufficient alcohol or alcohol/water is used to result in a dissolved EVOH concentration of about 1% to about 25% (w/w), preferably about 2% to about 20% and most preferably about 5% to about 15%.

The elevated temperature used depends on the alcohol or the alcohol/water mixture used for the dissolution. The EVOH must be completely dissolved in the alcohol or alcohol/water mixture for optimal performance of the method herein. EVOH, however, does not dissolve in alcohols at ambient temperature, but does dissolve in methanol at about 90° C., in 95% ethanol at about 100° C. and in isopropanol at about 120° C. Because the temperatures are above the boiling points of the respective alcohols, high-pressure equipment such as ASME rated pressure vessels, typically made of stainless steel, or high pressure glass vessels are used.

Alternatively, alcohol/water mixtures may be used. EVOH dissolves in alcohol/water blends of methanol, ethanol, and isopropanol. For example, EVOH will dissolve at about 70° C. in mixtures of isopropanol or ethanol and water at about a 2:1 to about 4:1 ratio (w/w). For alcohol/water mixtures, sufficient alcohol should be present to prevent microbial growth.

Dissolution of the EVOH in alcohol or in an alcohol/water mixture generally occurs in about 0.25 to about 10 hours depending on the alcohol or alcohol/water mixture used. The EVOH-solvent mixture may be agitated to assist in the dissolution of the polymer in the hot alcohol or alcohol/water mixture. For methanol or 95% ethanol at an elevated temperature and with agitation, dissolution occurs in about 1 to 2 hours. On the other hand, if agitated at 70° C. in an alcohol/water mixture, dissolution occurs in about 3 hours for 2:1 isopropanol/water and about 4-5 hours for 3:1 or 4:1 isopropanol/water. Ethanol/water mixtures at 2:1, 3:1, or 4:1 take about 3 hours at each of the indicated ratios. The exact dissolution times will depend on the agitation used, the power input by the agitator, the temperature, the polymer percent solids, and other parameters.

Once a solution of the EVOH in an alcohol or an alcohol/water mixture has been obtained at an elevated temperature, if a fluid that is a non-solvent for the EVOH is added to the solution, the usual result is that the EVOH precipitates as a sticky mass of material. It has surprisingly been found, however, that if the solution is cooled until a gel forms and the non-solvent fluid is then combined with the gel, a precipitate of discrete polymer particles is obtained. Combination of the gel with a fluid may be accomplished by adding the fluid to the gel or the gel to the fluid.

The solution may be cooled with or without agitation. In one aspect, before the fluid is added, the solution is cooled without agitation until a discrete gel is formed, that is, until the solution becomes a solid mass of the general consistency of the commercial gelatin dessert, JELLO®. It is, however, also an aspect of this invention that as the solution shows signs of beginning to gel, that is, the solution begins to thicken and "set up," agitation may be resumed at a speed that prevents the solution from setting up but does not substantially deter the gelling process. Without being held to any particular theory, it is believed that in this aspect the polymer will still assume the properties of a fully gelled solution with regard to hydrogen bonding between polymer chains, etc., such that, when the fluid is added to the solution the effect will be the same as in the case of the fully gelled solution, that is, discrete particles of substantially purified polymer will form. For the sake of brevity, convenience and clarity reference hereinafter to a "gel" is understood to refer to both a fully formed, solid gel and to the agitated gel-like mixture obtained when agitation is resumed before the solid gel can form.

By "substantially purified" is meant that a large portion of whatever impurities were contained in the commercial EVOH pellets is not present in the particles formed although it is understood that not absolutely all of such impurities are necessarily removed in a single purification. Straight forward chemical analysis of the particles obtained will readily reveal the degree of purification and based thereon it can be determined if repeats of the process, which is an aspect of this invention, are desirable.

Cooling of the EVOH/alcohol or alcohol/water mixture may be accomplished by virtually any means. The simplest means is to remove the heating source and allow the solution to cool to room temperature, but other means such as cooling jackets, cooling coils, placing the solution-containing container in an ice bath or refrigerator can be used. It is not required that the cooling occurs at any particular rate, but a cooling rate that is too high may be detrimental to the creation of a gel. Those skilled in the art will be able to determine an appropriate cooling rate based on the disclosures herein.

After sufficient cooling and time to convert the solution of EVOH in the alcohol or alcohol/water to a gel has elapsed, a fluid is then combined with the gel and the mixture is vigorously agitated. In the case where the solution has been agitated throughout, the rate of agitation may, and if fact probably will, have to be substantially increased. Again, those of ordinary skill in the art will be able to readily determine the appropriate level of agitation based on the disclosures herein.

The added fluid used should be a non-solvent for EVOH at ambient temperature. This includes the same alcohol used to dissolve the EVOH at an elevated temperature since as noted above EVOH is generally not soluble in the alcohols at ambient temperature. The fluid may also be an obvious non-solvent for EVOH such as acetone, or a hydrocarbon, for example without limitation, hexane. The combination of the fluid with the gel creates an "admixture" in which the gel converts to, or is broken up into, discrete particles of EVOH. Combining the fluid with the gel can be carried out over, preferably, anywhere from about 30 seconds to about 30 minutes, although longer addition times are not prohibited.

The resulting admixture may be further agitated for up to about 24 hours. The mass ratio of the fluid to the gel should be about 1:1 to about 10:1.

The size of the particles formed by the method herein may vary substantially depending primarily on percent polymer solids of the gel, the nature and rate of addition of the fluid to the gel, and the resulting intensity of agitation. The size may vary from essentially colloidal if the added fluid is methanol or ethanol. Larger particle sizes are obtained with added water or hexane.

Once the polymer particles have formed, they are isolated from the solution by any of a number of techniques depending to some extent on the particle size, and percent solids. That is, one procedure is filtration using a 2.7 micron glass filter and a suction apparatus. However, filtration may be slow for smaller particles. Centrifugation at 3000 rpm (2400 rcf) for 10 minutes is another non-limiting isolation technique. After centrifugation, a firm cake of particles is produced, allowing the supernatant to be poured off. Other methods of particle isolation may be used, and filtration and or centrifugation with other processing conditions may be used.

Prior to solvent removal, the particles may be optionally rinsed with another fluid, which is a non-aqueous fluid. The fluid may be the same as or different from the fluid that was combined with the gel. The rinsing operation may occur with agitation of the dispersion, and at a temperature above ambient, but below the elevated temperature used for dissolution, such as without limitation, 40° C. The duration may be about 30 minutes to about 6 hours, although longer times are not prohibited. In preferred embodiments, the particles are rinsed in the same fluid that is combined with the gel, or an alcohol, such as without limitation, methanol, ethanol, isopropanol, or n-propanol.

Finally, residual solvent is removed from the particles by exposing the particles to ambient temperature, to a temperature above ambient temperature, placing the particles in an environment of reduced pressure, or a combination of elevated temperature and reduced pressure. Non-limiting examples include placing the particles in a forced air convention oven or a vacuum oven, drying the particles in a tumble drier, or in a fluidized bed drier. As an example, the particles may be exposed to temperature greater than the boiling point of the solvent, such as, without limitation, 120° C. The duration of exposure to the elevated temperature or to a vacuum may be from about 1 hour to 36 hours or more. Residual solvent may be measured using Thermal Gravimetric Analysis ("TGA"), solvent extraction followed by gas chromatography, headspace analysis, or any other appropriate method. Removal of the alcohols is more easily accomplished than removal of water.

If dried in an oven at an elevated temperature, the polymer particles may tend to coalesce over time. It is believed that the coalescence may be avoided, or at least minimized, by drying the particles in a non-solvent for the polymer as opposed to a solvent that swells the particles. Thus, a rinse in a "non-solvent" (fluid that does not swell the polymer, or if it swells the polymer, by no more than 10% by mass) may be performed before the solvent removal. The rinse in a non-solvent may occur after the optional rinsing operation discussed above.

The polymer may be subjected to several repetitions of operations (1)-(4), with each repetition occurring after the particles have been isolated or, alternatively, after the solvent has been removed. Different solvents extract different impurities so several different solvents may be used in each repetition.

It is believed that the methods of the present invention may allow for purification of the EVOH in about 24 hours, compared to the previously used process which takes about 6-7 days. It is expected that a scaled up process would include the following operations:

(a) dissolving the EVOH in an alcohol or alcohol/water mixture at an elevated temperature, and optionally, an elevated pressure;

(b) cooling the solution to ambient temperature with or without agitation to produce a gel;

(c) combining the gel with a fluid and agitating the admixture;

(d) isolating the polymer particles;

(e) optionally rinsing the polymer particles with the same fluid as (c) or another fluid;

(f) optionally rinsing the polymer particles a second time in a fluid that is a non-solvent (does not swell the polymer particles, or if swelling occurs, it is not more than about 10% by mass uptake of solvent)

(g) drying the particles.

It is believed that the methods of the present invention may allow for an improvement in the purity of the EVOH. The gellation process itself effects purification as alcohol soluble impurities will stay in the solvent phase and be excluded from any crystalline phase formed by the EVOH. Another advantage is that the particles formed by the methods of the present invention are small with a very high surface area for a given amount of polymer when compared to the pellets. Their small size, combined with the fact that they are highly swollen, makes extraction of additional impurities rapid. The smaller particle and reduced extraction time also allow for extraction in multiple solvents.

The purified EVOH may be used for the fabrication of an implantable medical device, such as without limitation, a stent. The device body may be fabricated from a material comprising the purified EVOH, or may be fabricated entirely, or substantially, from the purified EVOH. A coating may be applied to the surface of an implantable medical device, the coating comprising the purified EVOH, or the coating consisting entirely, or substantially, of either the purified EVOH or the purified EVOH and one or more drugs. In some methods, the EVOH is used to fill depots, or indentations, in the surface of the device body, or may be used in another aspect of the device.

EXAMPLES

The embodiments of the present invention will be illustrated by the following examples. These examples are not to be construed as limiting the scope of this invention in any manner.

Example 1

Dissolution in Alcohol

To each of three high pressure glass tubes, 2.7 g of EVOH (EVAL Company of America, lot EC-151A, 44 mole % ethylene, batch LOST31) was added. To two of the tubes, 24 g of methanol (Aldrich HPLC grade 99.93%) was added, and to the third tube, 24 g of ethanol (190 proof, or 95% by volume, Aldrich). The tubes were heated in a bath at 90-100° C., and stirred with a magnetic stir bar for 2 hours. All three tubes were allowed to sit overnight during which time they cooled to ambient temperature. A gel formed in each of the three tubes.

Methanol, 80 g, was added to one of the methanol gels, and hexane, 80 g, was added to the other methanol gel. Additional Ethanol, 80 g, was added the ethanol gel. These three solutions were stirred with a magnetic stir bar overnight at room temperature. The polymer particles produced were separated by centrifugation at 3000 rpm (2400 cfm) for 10 minutes with a Beckman Allegra 21R centrifuge. The polymer particles were placed into vessels to which 80 g of methanol was added to the particles formed by the addition of methanol and hexane, and 80 g of ethanol (95% by volume) for the particles formed by the addition of ethanol (95% by volume). The particles were stirred overnight again and separated by centrifugation. The particles formed a "cake" at the bottom of the centrifuge tube which was spread over petri dishes to a depth of about 3 to 6 mm. The petri dishes were placed in a vacuum oven at 120° C. and 28 inches mercury for 48 hours.

Solvent extracts and solids residue were analyzed by FTIR spectroscopy. The extracts from methanol for the all methanol process did not show a characteristic EVOH impurity peak at 1560 $cm^{-1}$, but an additional peak at 1753 $cm^{-1}$ was present. The hexane and methanol extracts both exhibited the 1560 $cm^{-1}$ peak, and the methanol extract also exhibited a peak at 1762 $cm^{-1}$ for the hexane/methanol process. For the all ethanol process, the first ethanol extract exhibited the 1560 $cm^{-1}$ peak as well as peaks at 1751 $cm^{-1}$ and 1637 $cm^{-1}$. The second ethanol extract however did not exhibit these three peaks, indicating that the impurities had been removed by the first extraction.

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

What is claimed is:

1. A method, comprising:
    providing a quantity of poly(ethylene-co-vinyl alcohol);
    dissolving the polymer in a sufficient quantity of an alcohol or an alcohol/water mixture at an elevated temperature so as to achieve substantially complete dissolution;
    cooling the dissolved polymer solution until a gel forms;
    combining the gel with a fluid while agitating the admixture until polymer particles form,
        wherein
        the fluid is the same as or different than the alcohol or alcohol/water used initially to dissolve the polymer and is at about the same temperature as the cooled dissolved polymer solution;
    isolating the polymer particles; and
    drying the isolated polymer particles,
        wherein,
        the method is optionally repeated one or more additional times using the polymer particles, as isolated or dried in the preceding application of the method, as the quantity of poly(ethylene-co-vinyl alcohol), and the same or a different alcohol or alcohol/water mixture and the same or a different fluid for each repetition.

2. The method of claim 1, wherein dissolving the polymer in a sufficient quantity of the alcohol or alcohol/water mixture occurs over about 0.5 to about 5.0 hours.

3. The method of claim 1, wherein the dissolved polymer solution is not agitated during cooling.

4. The method of claim 1, wherein the dissolved polymer solution is agitated during cooling.

5. The method of claim 1, wherein the alcohol is methanol, ethanol, n-propanol, isopropanol or a combination thereof.

6. The method of claim 1, the alcohol/water mixture comprises 35% by weight water or less.

7. The method of claim 5, wherein:
    the alcohol is methanol and the elevated temperature is about 90° C.; or
    the alcohol is 95% ethanol and the elevated temperature is about 100° C.; or
    the alcohol/water mixture is ethanol/water or isopropanol/water, at about 2:1 to about 4:1 (w/w), and the elevated temperature is about 70° C.

8. The method of claim 5, wherein the alcohol/water mixture is 90% methanol by weight, or 80% by weight of 95% ethanol.

9. The method of claim 1, wherein cooling the dissolved polymer solution comprises exposing the solution to ambient conditions and allowing it to cool naturally to ambient temperature.

10. The method of claim 1, wherein cooling the dissolved polymer solution comprises using a cooling jacket, cooling coils, or a combination thereof.

11. The method of claim 1, wherein the fluid comprises an alcohol that may be the same as or different from the alcohol used to initially dissolve the polymer.

12. The method of claim 1, wherein the fluid comprises an alcohol/water mixture that may be the same as or different than the alcohol or the alcohol/water mixture used to initially dissolve the polymer and may be at the same or different alcohol to water ratio.

13. The method of claim 1, wherein the fluid comprises water.

14. The method of claim 1, wherein the fluid comprises acetone, 2-butanone, ethyl acetate, methyl acetate, tetrahydrofuran, ether, a class III ICH solvent, or a combination thereof.

15. The method of claim 1, wherein the fluid comprises a non-polar solvent.

16. The method of claim 15, wherein the non-polar solvent comprises hexane, cyclohexane, pentane, heptane, a $C_5$-$C_{12}$ branched, linear, cyclic, aliphatic, aromatic, or unsaturated hydrocarbon, or a combination thereof.

17. The method of claim 1, wherein combining the fluid and the gel comprises adding the fluid to the gel or adding the gel to the fluid.

18. The method of claim 1, wherein combining the fluid and the gel occurs over about 30 seconds to about 30 minutes.

19. The method of claim 1, wherein isolating the polymer particles comprises filtration, centrifugation, or gravity sedimentation.

20. The method of claim 1, wherein drying the isolated polymer particles comprises exposing the polymer particles to a temperature of from about 25° C. to about 120° C.

21. The method of claim 20, where exposing the polymer particles to the temperature comprises using a vacuum oven, a forced convection oven, a tumble drier or a fluidized bed drier.

22. The method of claim 1, wherein the ethylene content of the poly(ethylene-co-vinyl alcohol) is about 20 mol % to about 50 mol %.

23. A method of manufacturing, comprising:
    providing a quantity of poly(ethylene-co-vinyl alcohol);
    purifying the quantity of poly(ethylene-co-vinyl alcohol) by the method of claim 1; and fabricating an implantable medical device, wherein the fabrication comprises at least one operation using a material comprising the purified poly(ethylene-co-vinyl alcohol).

24. The method of claim 23, wherein fabricating the implantable medical device comprises:

providing an implantable medical device; and
disposing a coating comprising the purified poly(ethylene-co-vinyl alcohol) over an outer surface of the implantable medical device.

* * * * *